US012706827B2

(12) United States Patent
Mishra et al.

(10) Patent No.: US 12,706,827 B2
(45) Date of Patent: Aug. 11, 2026

(54) USER LOAD SIMULATION

(71) Applicant: Rakuten Symphony, Inc., Tokyo (JP)

(72) Inventors: Ashok Kumar Mishra, San Jose, CA (US); Ramendra Pratap Singh, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/247,229

(22) PCT Filed: Dec. 13, 2022

(86) PCT No.: PCT/US2022/052725
§ 371 (c)(1),
(2) Date: Mar. 29, 2023

(87) PCT Pub. No.: WO2024/129067
PCT Pub. Date: Jun. 20, 2024

(65) Prior Publication Data

US 2025/0300924 A1 Sep. 25, 2025

(51) Int. Cl.

| | |
|---|---|
| ***G06F 15/173*** | (2006.01) |
| ***H04L 41/14*** | (2022.01) |
| ***H04L 41/22*** | (2022.01) |
| ***H04L 43/062*** | (2022.01) |
| ***H04L 43/55*** | (2022.01) |

(52) U.S. Cl.
CPC ............ *H04L 43/55* (2022.05); *H04L 41/145* (2013.01); *H04L 41/22* (2013.01); *H04L 43/062* (2013.01)

(58) Field of Classification Search
CPC ....... H04L 43/55; H04L 41/145; H04L 41/22; H04L 43/062
See application file for complete search history.

(56) References Cited

U.S. PATENT DOCUMENTS 6,898,564 B1 * 5/2005 Odhner ............... G06F 11/3433 703/2
8,532,970 B2 9/2013 White
8,762,113 B2 6/2014 Santhosh
8,806,482 B1 * 8/2014 Nagargadde .......... H04L 45/586 718/1
9,077,643 B1 * 7/2015 Cabrera ................ H04L 41/145
9,424,052 B2 8/2016 Overton
2003/0125924 A1 * 7/2003 Lines ...................... H04L 67/75 703/20
2011/0282642 A1 11/2011 Kruger
2012/0060167 A1 3/2012 Salsburg
2019/0139076 A1 * 5/2019 Holladay ............ G06F 9/45558
(Continued)

*Primary Examiner* — Duyen M Doan
(74) *Attorney, Agent, or Firm* — David R. Stevens; Stevens Law Group

(57) ABSTRACT

A user load specification is received that specifies a number of simulated users, one or more simulated locations of the simulated users, one or more uses (controller or client) of the simulated users, and one or more roles of the simulated users. A user load simulator generates commands from simulated user instances to a computing installation (e.g., cluster), receives response to the commands, and updates states of the simulated user instances according to the responses. The commands and how the commands are submitted may be in accordance with the location, use, and/or role of each simulated user. The computing installation is monitored and observability data from the computing installation is related to the commands.

13 Claims, 5 Drawing Sheets

(56) References Cited

U.S. PATENT DOCUMENTS

2020/0342148 A1* 10/2020 Banks ........................ G06F 9/54
2021/0382725 A1 12/2021 Vemula
2022/0214960 A1* 7/2022 Zhong ................. G06F 11/3698
2022/0222171 A1 7/2022 Poulin
2022/0299965 A1 9/2022 Pancholi et al.
2022/0300407 A1 9/2022 Gardner et al.

* cited by examiner

USER LOAD SIMULATION

BACKGROUND

Field of the Invention

This invention relates to performing user load simulation.

Background of the Invention

Many computing applications are extremely complex and require many components executing on many different host computing devices to operate and interoperate correctly. Many computing applications are further required to handle requests from many users simultaneously.

It would be an advancement in the art to facilitate the deployment of complex multi-user applications.

SUMMARY OF THE INVENTION

An apparatus includes one or more processing devices and one or more memory devices operably coupled to the one or more processing devices. The one or more memory devices store executable code that, when executed by the one or more processing devices, causes the one or more processing devices to receive a user load specification defining one or more types of simulated users. Commands are generated to a computing installation from simulated users having the one or more types. Observability data of the computing installation resulting from the loading is monitored. A report relating the observability data to the commands is then output.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
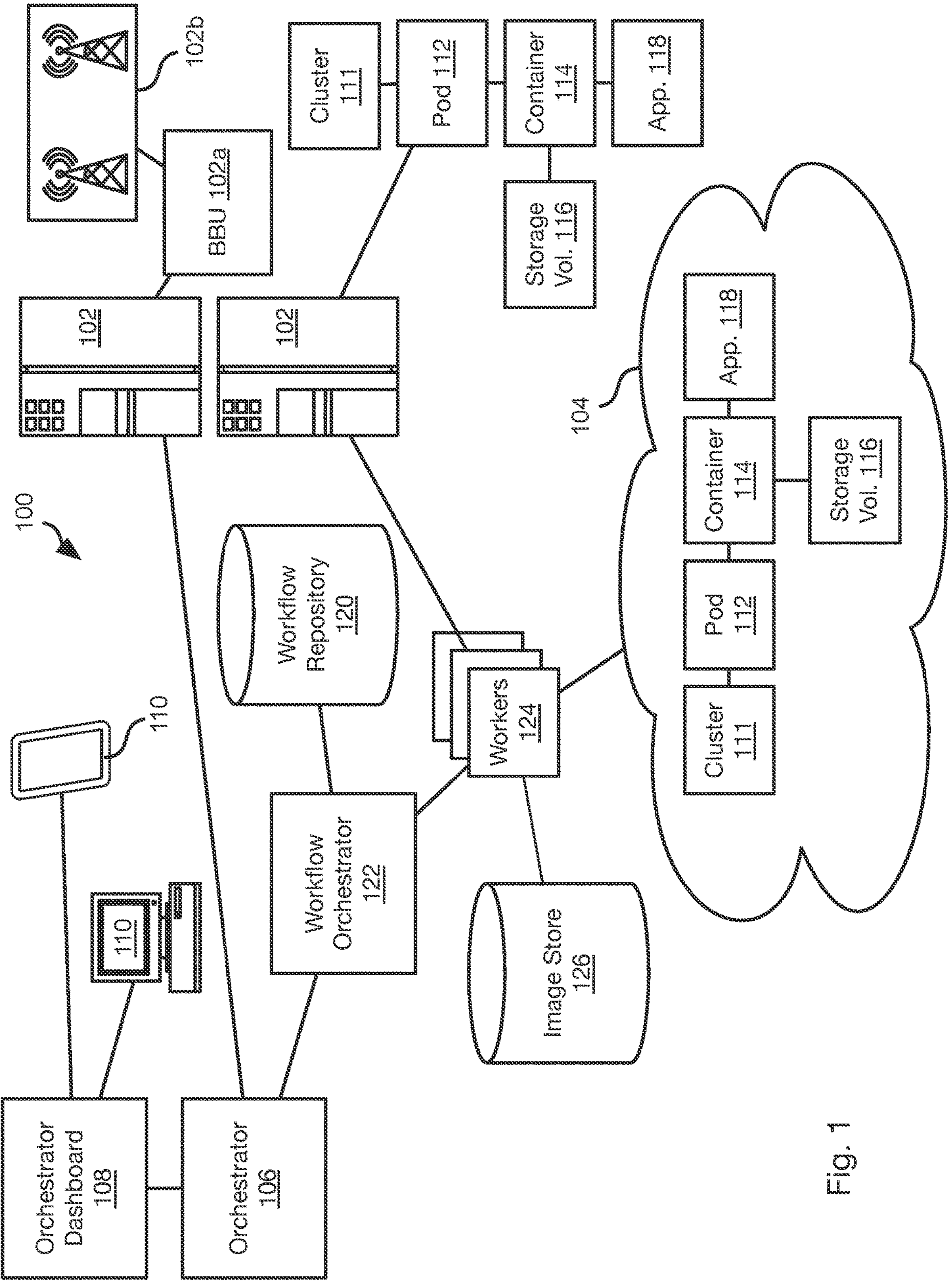
FIG. 1 is a schematic block diagram of a network environment in which a complex application may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 500 of FIG. 5.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102*a* that provide translation between radio frequency signals output and received by antennas 102*b* and digital data transmitted and received by the servers 102. For example, each BBU 102*a* may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QoS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
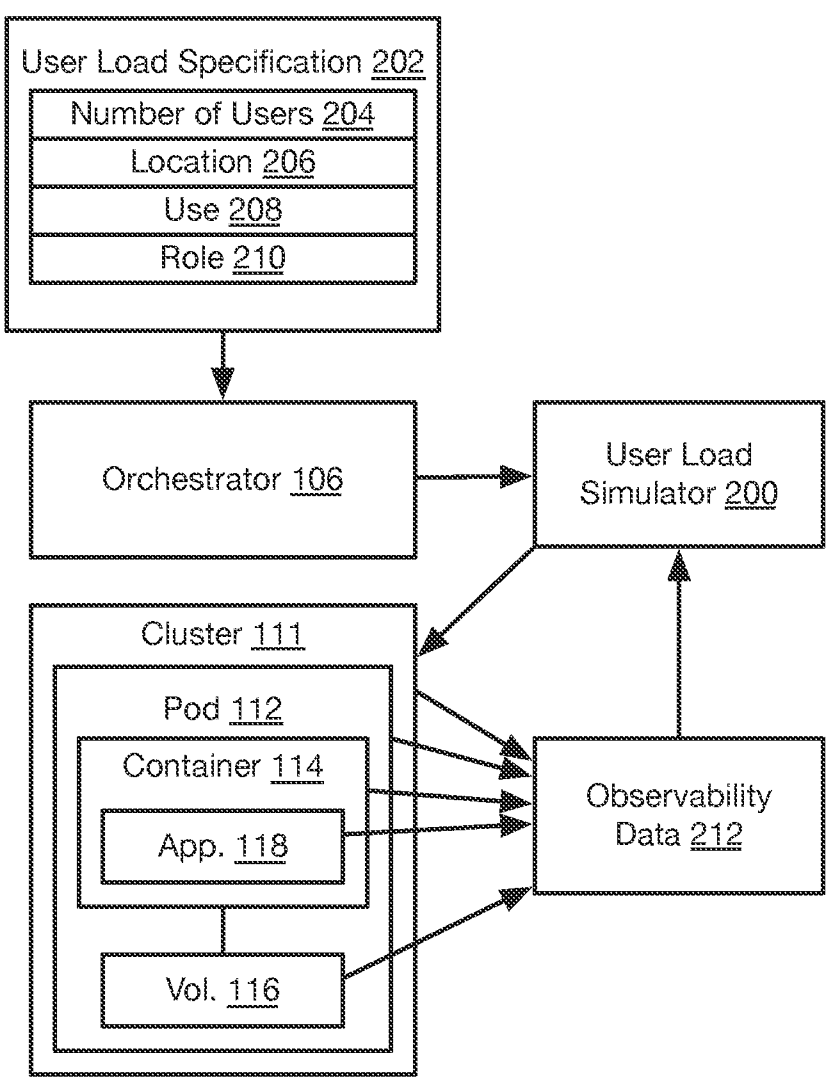
FIG. 2 is a schematic block diagram showing components for performing user load simulation in accordance with an embodiment.

Referring to FIG. 2, use of a cluster 111 may be simulated using a user load simulator 200 in order to test real-world performance prior to use for production tasks. For example, a user may submit a user load specification 202 to the orchestrator 106, such as through the orchestrator dashboard 110.

The user load specification 202 may specify parameters for simulating loading of a cluster 111. For example, the user load specification 202 may specify parameters such as a number 204 of users to simulate, a location 206 for the simulated users, a type, and a roles 210 of the users. The location 206 may be a specific location, such as access from a particular country, cloud region, network, or other definition of location. The location 206 may simply be a binary location: local or remote relative to the computing device hosting the cluster 111. The use 208 may specify whether the users are client users or control users. Client users may simulate accessing the services of the cluster 111 by clients, such as clients using a graphical interface to access the services of the cluster 111. Control users may simulate accessing the cluster as an administrator performing control tasks relative to the cluster 111, such as through a command line interface (CLI) or other type of interface. The roles 210 may refer to roles for performing role-based access control RBAC in order to test security and robustness of the cluster 111 in enforcing RBAC policies.

The user load specification 202 may be uniform: all users have the same location 206, use 208, and roles 210 and a separate load specification 202 may be submitted to simulated other types of users. Alternatively, the user load specification 202 may specify different types of users, each type of user having a different values for one or more of the location 206, use 208, and roles 210. The number 204 of users may then specify a number of users for each type. As an alternative, the user load specification 202 may include a set of user load specifications, each user load specification corresponding to one simulated user and having a location 206, use 208, and role 210. Note that the location 206, use 208, and role 210 are exemplary only and any number of other parameters may be used to define one or more simulated users.

The orchestrator 106 may pass the user load specification 202 to the user load simulator 200. The user load simulator 200 instantiates user instances according to the user load specification 202. In particular, the user load simulator 200 may instantiate the number of users having the type or types specified in the user load specification 202. Instantiating a user may include instantiating a thread of execution, a process, an application instance 118, a state machine, data structure, or other construct. Each user instance, groups of user instances, or all user instances may be implemented by a workflow from the workflow repository 120 and executed by a worker 124. Each user instance generates commands, receives responses, updates the state of the user instance according to the responses, generates additional commands based on the state of the user instance, and so on. Commands may include commands for logging in, creating an account, querying a database, opening an application, requesting information, invoking performance of a computation, invoking generation of a model, accessing log data, accessing a control console, performing an administrative task, instantiating a component (cluster 111, pod 112, container 114, storage volume 116, application instance 118), or other action.

The user load simulator 200 may also access observability data 212 for components of the cluster 111. Observability data represented as a log file or in another format that may be collected and processed in a like manner. Observability data may include metrics, events, alerts, inventory, and other data may be collected.

The user load simulator 200 may correlate the observability data with commands from the user instances in order to characterize performance of the cluster 111. For example, observability data 212 for each component of the cluster that is invoked in response to commands may be retrieved and characterized. For example, latency, number of error messages, number of successfully completed commands, processing cycles used, memory used, or other metrics may be gathered and plotted as a function of time. Alternatively latency, number of error messages, number of successfully completed commands, processing cycles used, memory used, or other metrics for a given time window may be plotted with respect to the number of commands generated in the given time window. Alternatively latency, number of error messages, number of successfully completed commands, processing cycles used, memory used, or other metrics for a given time window may be divided by the number of commands generated in the given time window. The latency, number of error messages, number of successfully completed commands, processing cycles used, memory used, or other metrics may also be processed to obtain a statistical characterization (mean, standard deviation, maximum, minimum, etc.) of these values during a period in which the component was processing commands from one or more user instances.

The result of the correlation may then be presented to a user, such as presented on a user computing device 110 by way of the orchestrator dashboard 108.

Figure 3:
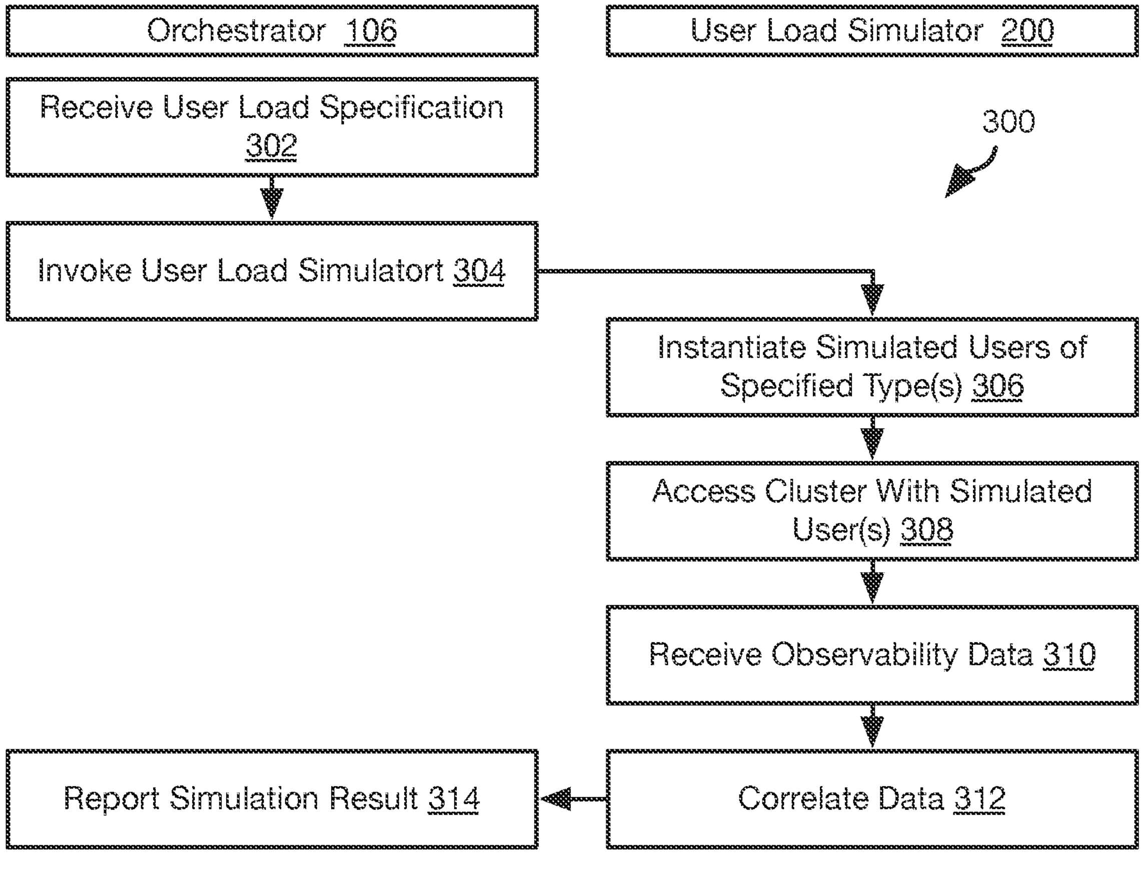
FIG. 3 is process flow diagram of a method for performing user load simulation in accordance with an embodiment.

FIG. 3 illustrates an example method 300 that may be executed by the orchestrator 106 and user load simulator 200. The method 300 may include receiving 302, by the orchestrator 106, a user load specification 202. Receiving 302 the user load specification 202 may include receiving the user load specification 202 through the orchestrator dashboard 110. The user load specification 202 may be received along with an identifier of the cluster 111 with respect to which the user load specification is to be implemented.

In response to receiving the user load specification 202, the orchestrator 106 invokes 304 implementation of the user load specification by the user load simulator 200. The orchestrator 106 may further pass additional information to the user load simulator 200 such as an identifier of the cluster, an access point identifier of the cluster, an IP address for an access point of the cluster, a uniform resource locator (URL) for accessing the cluster or other information.

In response to receiving the user load specification 202, the user load simulator instantiates 306 user instances. Instantiating 306 a user instance may include, for each user instance, instantiating a thread of execution, a process, an application instance 118, a state machine, data structure, or other construct. Instantiating 306 each user instance or all user instances may include invoking a workflow from the workflow repository 120 and executed by a worker 124.

The method 300 further includes accessing 308 the cluster 111 using the user instances. The accessing 308 may be performed substantially simultaneously such that real world loading of the cluster 111 may be simulated. In particular, where the user instances are executing in different threads, containers, or processes, possibly on different hosts, many commands may be generated by the user instances substantially simultaneously. As used herein "substantially simultaneously" may be understood as multiple user instances generating commands before any of the multiple instances receive any responses to the commands from the cluster 111.

Accessing 308 the cluster 111 with the user instances may include each user instance (a) generating a command based on the state of the user instance, (b) receiving a response from the cluster, (c) updating the state of the user instance according to the response, and repeating from (a) for one or more iterations. Step 308 may continue until stopped by a user, the cluster 111 fails, latency of the cluster 111 reaches a predefined critical level, a predefined time period has elapsed, or some other stopping criteria occurs. Step 308 may include each user instance executing a script according to its type such that step 308 continues for a user instance until the script is completed. Commands executed as part of step 308 may include commands for logging in, creating an account, querying a database, opening an application, requesting information, invoking performance of a computation, invoking generation of a model, accessing log data, accessing a control console, performing an administrative task, instantiating a component (cluster 111, pod 112, container 114, storage volume 116, application instance 118), or other action.

The method 300 may include receiving 310 observability data for the cluster 111 and components of the cluster 111. The observability data may be received at the same time as step 308 is being performed and/or the observability data may be data generated by the cluster 111 and/or the components thereof at the time step 308 is performed and possibly for some transition period after step 308 is completed.

The method 300 may include correlating 312 the observability data with the loading from step 308. Step 312 may additionally or alternatively include any processing of the observability data to facilitate interpretation of the observability data. For example, latency, number of error messages, number of successfully completed commands, processing cycles used, memory used, or other metrics may be gathered and plotted as a function of time. The latency, number of error messages, number of successfully completed commands, processing cycles used, memory used, or other metrics may also be processed to obtain a statistical characterization (mean, standard deviation, maximum, minimum, etc.) of these values during a period in which the component was processing commands from one or more user instances. The latency, number of error messages, number of successfully completed commands, processing cycles used, memory used, or other metrics may be divided by, or otherwise combined with, the number of commands in order to relate the number of commands being processed by the cluster to any of these values. For example, a timeline may be divided into bins and values (e.g., latency, number of error messages, number of successfully completed commands, processing cycles used, memory used, or other metrics) received at times within a bin may be aggregated (summed, used to calculate a statistical characterization, etc.). The number of commands generated at times within a bin may also be aggregated. For a given bin, the aggregated values and the aggregated commands may be processed to correlate the aggregated values to the aggregated commands. For example, a ratio of the aggregated values to the aggregated commands may be calculated.

The result of the correlation 312 may then be reported 314 to the orchestrator 106. The orchestrator 106 may present the result of the correlation to the user, such as by transmitting a graphical representation of the result of the correlation to the user device 110 of a user that submitted the user load specification at step 302.

Figure 4:
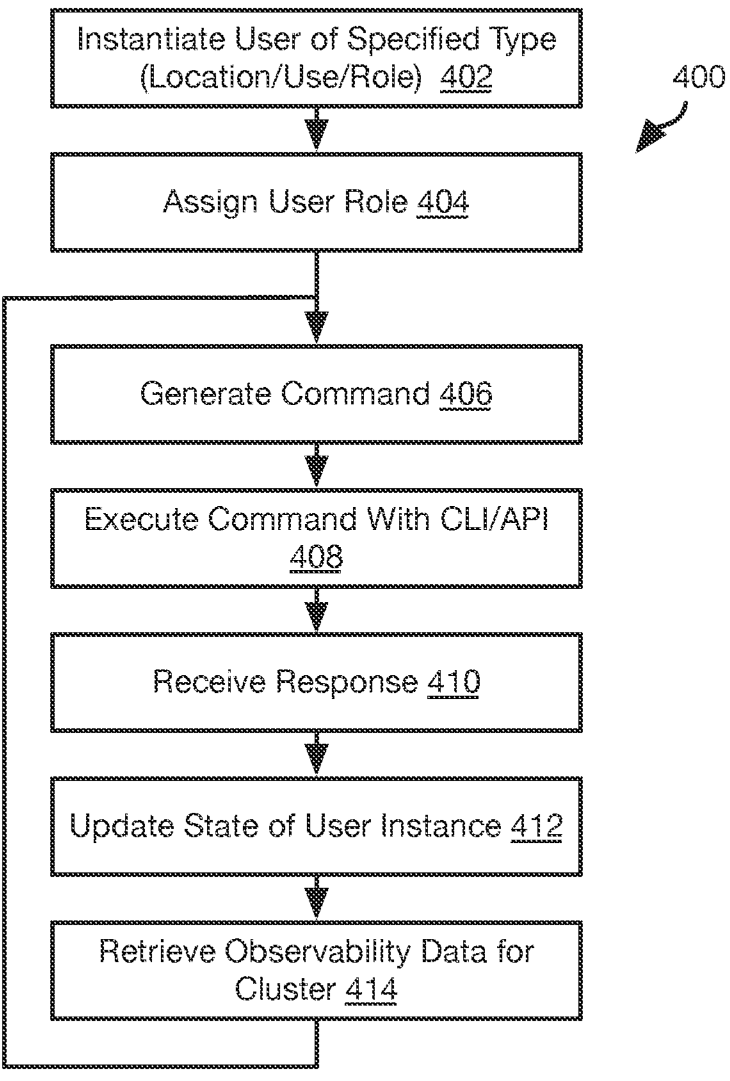
FIG. 4 is a process flow diagram of a method for implementing loading by a simulated user in accordance with an embodiment.

FIG. 4 illustrates a method 400 for simulating loading by a user instance. The method 400 may be executed by the user load simulator 200 (or some other component invoked by the user load simulator 200), such as when performing steps 306-308 of the method 300. The method 400 may be performed either (a) with respect to each user instance or (b) with respect to a group of identical user instances. In the following description "the user instance" is referenced with the understanding that multiple user instances may also be processed in the same manner.

The method 400 may include instantiating 402 the user instance. The user instance is instantiated 402 with the attributes specified for the user instance in the user load specification 202. In particular, the user instance may have a simulated location (local or remote) indicated in the location 206. For example, a simulated remote user instance may include a simulated browser, network connection, and other properties of a remote user.

The user instance may have a simulated use as a client or a controller of the cluster. The simulated use may be implemented as a script, set of commands, or workflow corresponding to the use 208 indicated in the user load specification 202.

The method 400 may further include assigning 404 the user instance a role in the cluster 111. For example, assigning 404 the user instance a role may include granting the user the role specified in the role 210 in the user load specification 202, i.e., grants the privileges corresponding to the role 210. Step 404 may include creating a user account for the user instance, the user account being assigned the role 210 or having privileges corresponding to the role 210.

The method 400 may then include generating 406 a command. The command may be from a script or workflow corresponding to the location 206, use 208, and role 210 of the user instance. The command may be generated based on the current state of the user instance and the state of the user instance may be updated in response to responses to commands received from the cluster 1111.

The method 400 may include executing 408 the command in accordance with the user load specification 202. For example, if the use 208 is for a client, the command may be input to an application programming interface (API) and/or graphical user interface (GUI) implemented by a component of the cluster 111 for receiving client commands. The command may be executed by submitting the request to a webserver implemented by the cluster 111, such as using a simulated browser. The command from step 406 may be executed 408 by transmitting the command to an IP address, URL, or other access point of the cluster that was provided by the orchestrator 106 or included in the user load specification 202.

If the use 208 is for control, the command may be executed 408 by opening a command line interface (CLI) to a component of the cluster or a host (server 102 or cloud computing platform 104) executing a component. The command may then be input through the CLI.

The method 400 may include receiving 410 a response to the command from the cluster 111. For example, the response may be an acknowledgement of successful completion of the command, an error message, a web page, a document, a query result, or other type of result. The method 400 may include updating 412 the state of the user instance according to the response. Updating 412 the state may include updating a state machine, processing the response with a script to determine a next action to be performed by the user instance, or some other action.

The method 400 may include retrieving 414 observability data for the cluster 111. For example, step 414 may include retrieving log data resulting from the command from step 408.

Steps 406-410 may be performed one or more additional times. Generating 406 the command may therefore include generating a command based on the state of the user instance following updating 412 the state of the user instance in the previous iteration.

Figure 5:
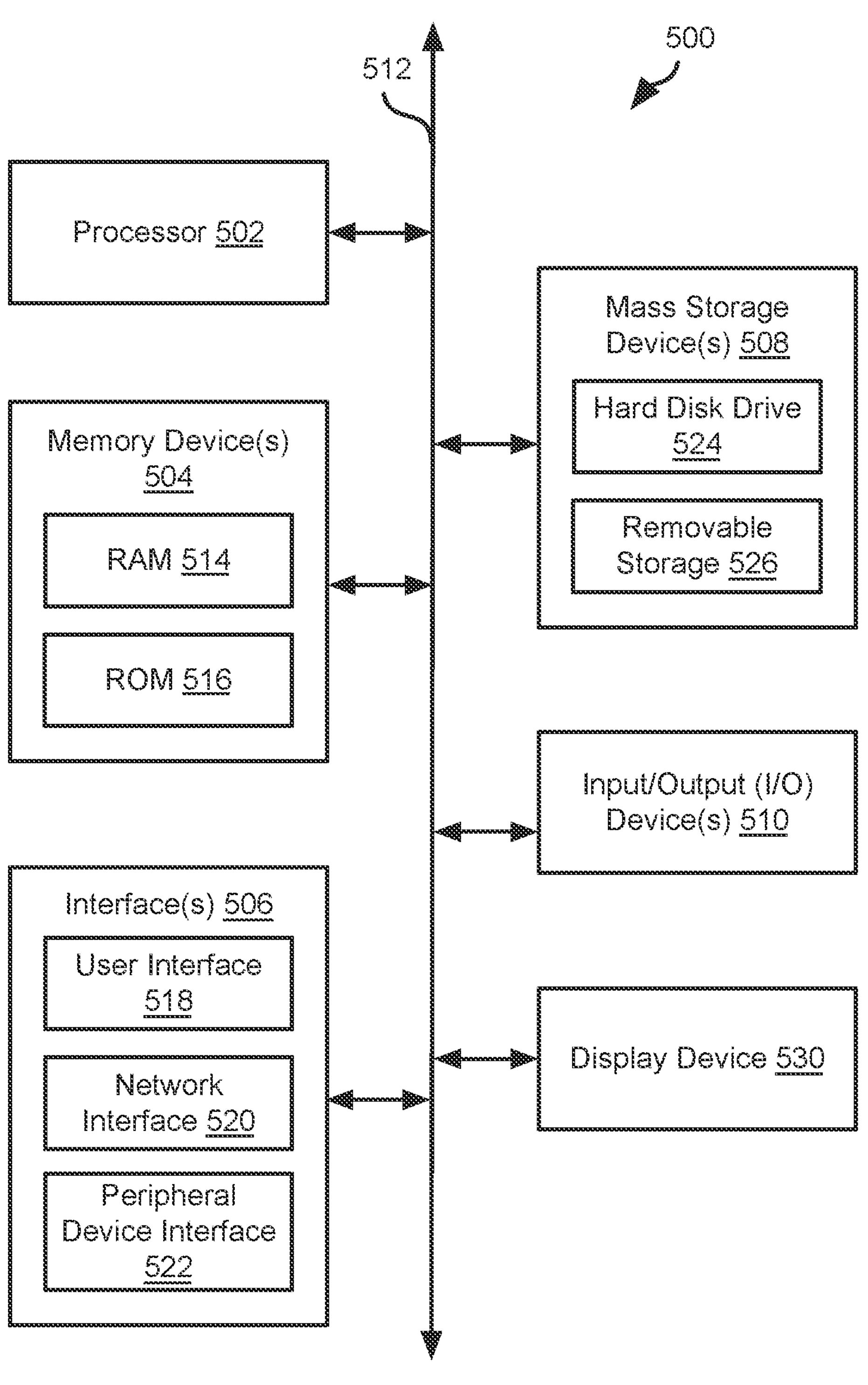
FIG. 5 is a schematic block diagram of an example computing device suitable for implementing methods in accordance with embodiments of the invention.

FIG. 5 is a block diagram illustrating an example computing device 500. Computing device 500 may be used to perform various procedures, such as those discussed herein. The servers 102, orchestrator 106, workflow orchestrator 122, cloud computing platform 104, and user load simulator 200 may each be implemented using one or more computing devices 500. The orchestrator 106, workflow orchestrator 122, and user load simulator 200 may be implemented on different computing devices 500 or a single computing device 500 may execute all of the orchestrator 106, workflow orchestrator 122, and user load simulator 200.

Computing device 500 includes one or more processor(s) 502, one or more memory device(s) 504, one or more interface(s) 506, one or more mass storage device(s) 508, one or more Input/output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives (“SSDs”) (e.g., based on RAM), Flash memory, phase-change memory (“PCM”), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A “network” is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
- one or more processing devices and one or more memory devices operably coupled to the one or more processing devices, the one or more memory devices storing executable code that, when executed by the one or more processing devices, causes the one or more processing devices to:
- receive a user load specification defining one or more types;
- generate commands to a computing installation from simulated users having the one or more types;
- receive responses to the commands; and
- update states of the simulated users according to the responses;
- monitoring observability data of the computing installation resulting from loading resulting from executing the commands; and
- outputting a report relating the observability data to the commands;
- wherein the user load specification specifies a type of use for the simulated users; and
- wherein the executable code, when executed by the one or more processing devices, causes the one or more processing devices to:
  - if the type of use is as a controller, submit the commands through a command line interface to the computing installation; and
  - if the type of use is as a client, submit the commands through a display interface;
- wherein the display interface is an application programming interface (API).

2. The apparatus of claim 1, wherein the user load specification specifies a simulated location of the simulated users.

3. The apparatus of claim 2, wherein the simulated location indicates whether the simulated users are local or remote.

4. The apparatus of claim 1, wherein the commands include at least one of creating an account, opening an application, invoking generation of a model, accessing a control console, performing an administrative task, or instantiating a component.

5. The apparatus of claim 1, wherein the executable code, when executed by the one or more processing devices, causes the one or more processing devices to:
- associate the simulated users with roles in the computing installation according to the user load specification; and
- perform role-based access of the computing installation.

6. The apparatus of claim 1, wherein the executable code, when executed by the one or more processing devices, causes the one or more processing devices to:
- update the states of the simulated users according to the responses by updating a state machine corresponding to each simulated user of the simulated users.

7. A method comprising:
- receiving, by a computer system, a user load specification defining one or more types;
- generating, by the computer system, commands to a computing installation from simulated users having the one or more types;
- receiving, by the computer system, responses to the commands; and
- updating, by the computer system, states of the simulated users according to the responses;
- monitoring, by the computer system, observability data of the computing installation resulting from loading resulting from executing the commands; and
- outputting, by the computer system, a report relating the observability data to the commands;
- wherein the user load specification specifies a type of use for the simulated users;
- wherein generating the commands comprises generating the commands corresponding to the type of use; and
- wherein the method further comprises:
  - in response to the type of use being as a controller, submitting the commands through a command line interface to the computing installation.

8. The method of claim 7, wherein the user load specification specifies a simulated location of the simulated users; and
- wherein generating the commands comprises simulating generating of the commands from the simulated location.

9. The method of claim 8, wherein the simulated location indicates whether the simulated users are local or remote.

10. The method of claim 7, wherein the commands include at least one of creating an account, opening an application, invoking generation of a model, accessing a control console, performing an administrative task, or instantiating a component.

11. A method comprising:
- receiving, by a computer system, a user load specification defining one or more types;
- generating, by the computer system, commands to a computing installation from simulated users having the one or more types;
- receiving, by the computer system, responses to the commands; and
- updating, by the computer system, states of the simulated users according to the responses;
- monitoring, by the computer system, observability data of the computing installation resulting from loading resulting from executing the commands; and
- outputting, by the computer system, a report relating the observability data to the commands;
- wherein the user load specification specifies a type of use for the simulated users;
- wherein generating the commands comprises generating the commands corresponding to the type of use; and
- wherein the method further comprises in response to the type of use is as a client, submitting the commands through a display interface;
- wherein the display interface is an application programming interface (API).

12. The method of claim 7, further comprising:
- associating, by the computer system, the simulated users with roles in the computing installation according to the user load specification; and
- performing, by the computer system, role-based access of the computing installation.

13. The method of claim 7, further comprising:

updating, by the computer system, the states of the simulated users according to the responses by updating a state machine corresponding to each simulated user of the simulated users.

* * * * *